COMMUNICATION SYSTEM

Original Filed June 10, 1944 4 Sheets-Sheet 1

INVENTOR.
ROBERT A CLARK JR.
BY Mueller, Dodge & Mason
ATTORNEYS

COMMUNICATION SYSTEM

Original Filed June 10, 1944 4 Sheets-Sheet 2

INVENTOR.
ROBERT A. CLARK JR.

BY
Mueller, Dodd & Mason
ATTORNEYS

COMMUNICATION SYSTEM

Original Filed June 10, 1944 4 Sheets-Sheet 3

INVENTOR.
ROBERT A. CLARK JR

BY Mueller, Dodds & Mann

ATTORNEYS

COMMUNICATION SYSTEM

Original Filed June 10, 1944 4 Sheets-Sheet 4

INVENTOR.
ROBERT A. CLARK JR.
BY Mueller, Dodds & Mason
ATTORNEYS

Reissued Dec. 15, 1953

Re. 23,751

UNITED STATES PATENT OFFICE 23,751

COMMUNICATION SYSTEM

Robert A. Clark, Jr., Chicago, Ill.

Original No. 2,393,291, dated January 22, 1946, Serial No. 539,672, June 10, 1944. Application for reissue April 24, 1952, Serial No. 284,121

30 Claims. (Cl. 179—82)

Figure 1:
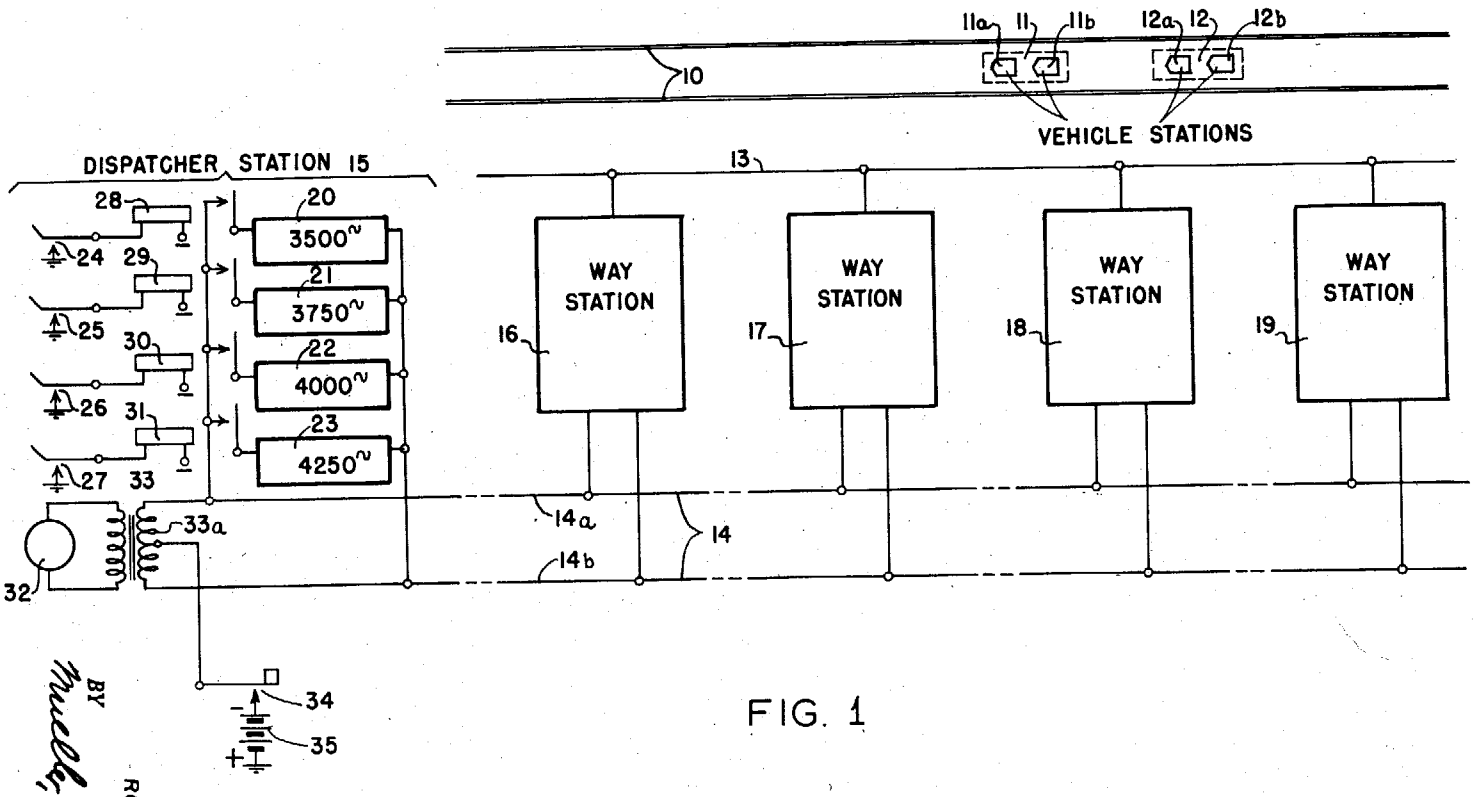

Matter enclosed in heavy brackets [ ] appears in the original patent but forms no part of this reissue specification; matter printed in italics indicates the additions made by reissue.

The present invention relates to communication systems and more particularly to an improved system for communicating between one or more stations of fixed location and a vehicle moving along a predetermined route.

Two-way space communication between a moving vehicle, such, for example, as a train, moving along a fixed route and one or more stations located along the route is of comparatively recent origin. It is recognized that in such a system the range of space communication must necessarily be restricted in order to minimize interference with long range radio transmission on assigned frequency channels. In at least one proposed system this has been accomplished by employing inductive coupling between the vehicle station and the way station to provide signal carrier energy transfer between the stations. The usual system arrangement of this character, however, makes no provisions for in any way utilizing the communicating or signaling facilities which may parallel the vehicle route in establishing communication channels between the vehicle station and the various points along the route. Thus the usual railway line is conventionally paralleled by telephone communication facilities between one or more centrally located dispatcher stations and control towers or way stations spaced along the line. Such railway lines are also usually paralleled by telegraph and power lines, yet these facilities are not normally used in establishing communication channels between the vehicle stations, the way stations, and the dispatcher station or stations.

It is an object of the present invention, therefore, to provide a system for communicating between a vehicle proceeding along a predetermined route and one or more stations of fixed location along the route, which effectively utilizes to the best possible advantage existing communicating facilities which may parallel the route.

It is another object of the invention to provide an improved system of the character described which may be employed to furnish two-way communication between a vehicle station and a dispatcher or master station over channels which respectively include different way stations located along the route over which the vehicle is travelling.

According to a further object of the invention, the vehicle and way stations are each equipped with space communication equipment of limited communication range, and the way stations are so spaced along the route that a substantial overlap is provided between the communication ranges of adjacent way stations, whereby the vehicle station is successively moved into the ranges of communication of successively adjacent way stations as the vehicle proceeds along the predetermined travel route.

According to yet another object of the invention, the space communication equipment at the various way stations is commonly coupled to a single signal radiating and pick-up line paralleling the vehicle route.

In accordance with a still further object of the invention a common, general purpose communication channel is utilized to interconnect the dispatcher or master station with the different way stations, and each way station includes facilities selectively controllable over the common channel for operatively associating the space communication equipment thereat with the common channel for the radiation of master station originated signals at the vehicle station and the relaying of vehicle station originated signals to the master station.

According to still another object of the invention, each way station is also provided with facilities controllable from the master station over the common channel for selectively reversing the direction in which signals may be transmitted between the master station and the vehicle station when the space communication equipment thereat is being utilized to communicate between the master and vehicle stations.

In accordance with yet another object of the invention, each way station is also equipped with means controllable from the vehicle station over a space link therebetween for establishing a monitoring channel between the vehicle station and the common channel.

More generally, it is an object of the present invention to provide an improved system of the character described which includes relatively simple and easily operable facilities for providing communication between a vehicle station and any one of a number of way stations or a dispatcher station.

Figure 2:
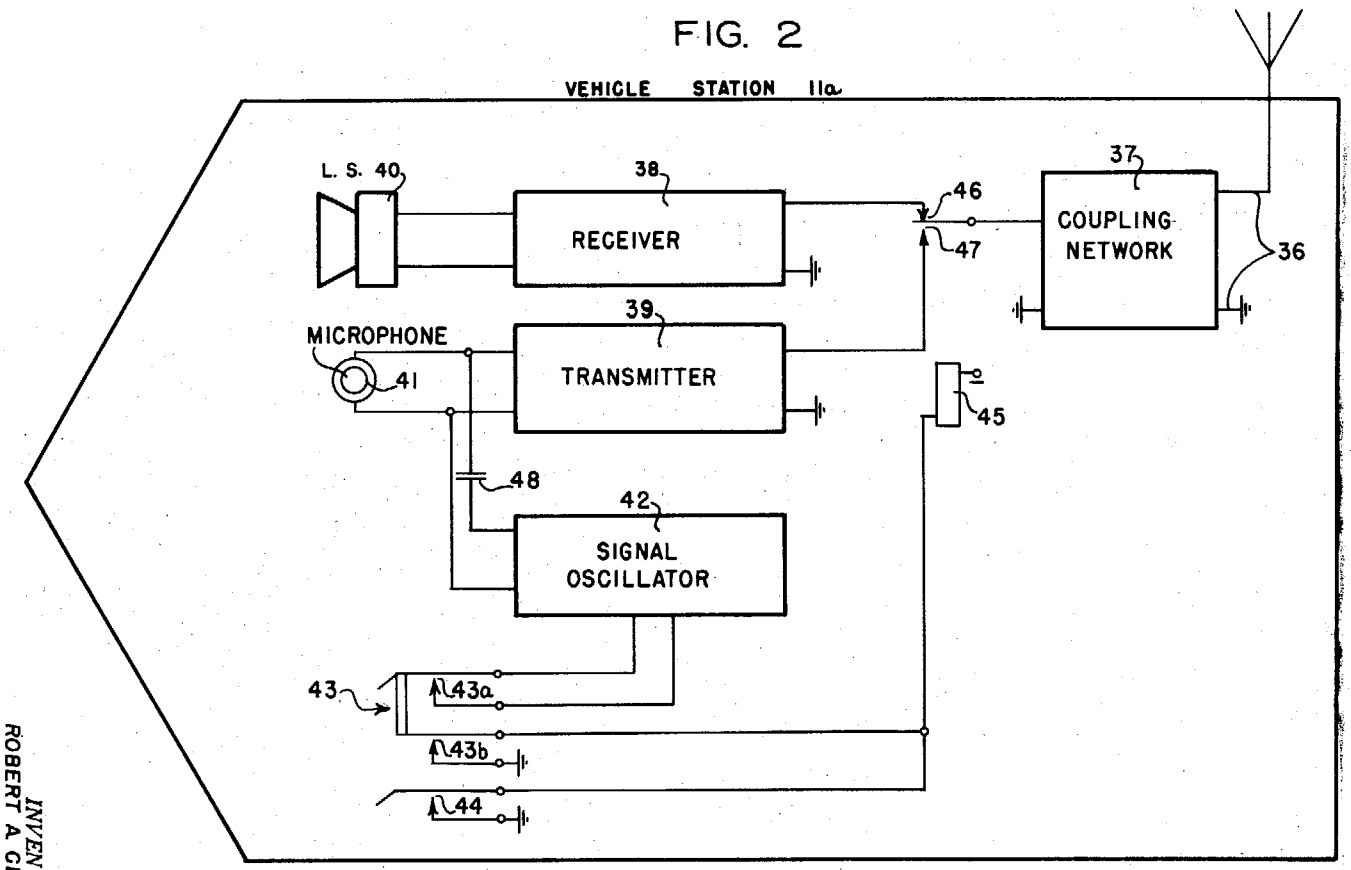
Figure 3:
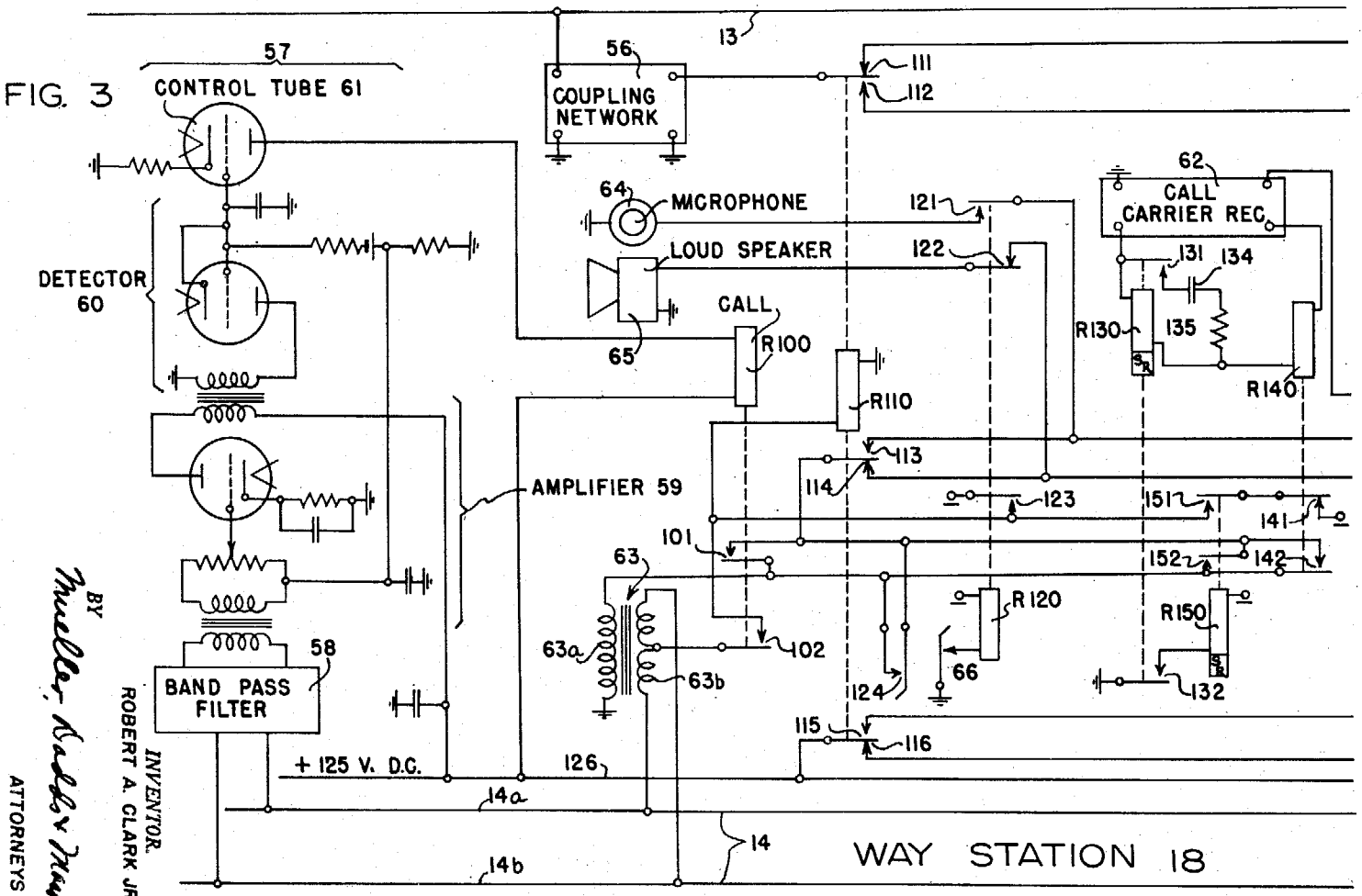
Figure 4:
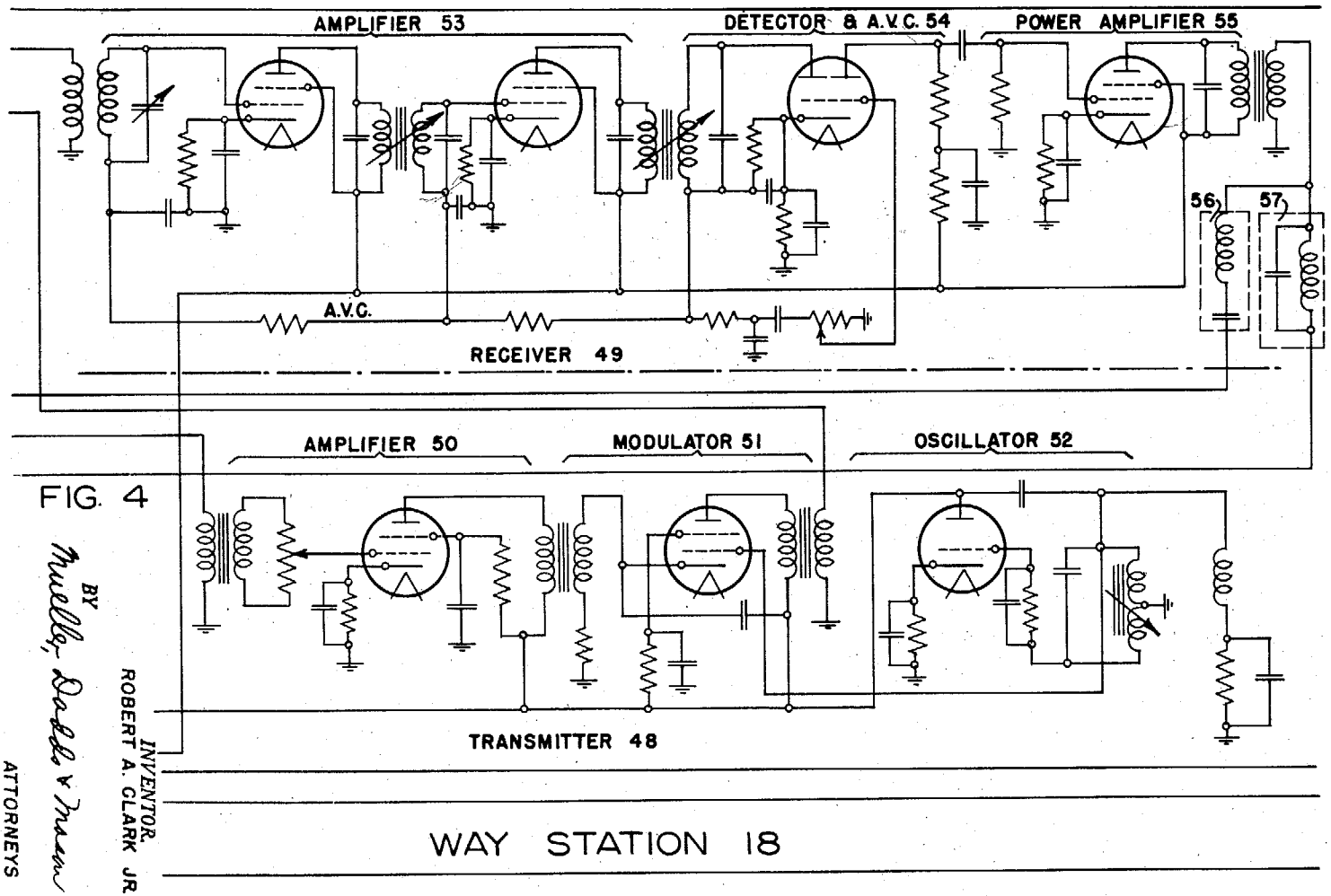

The invention, both as to its organization and method of operation, together with further objects and advantages thereof, will best be understood by reference to the specification taken in connection with the accompanying drawings in which:

Fig. 1 diagrammatically illustrates an improved communication system characterized by the features of the present invention;

Fig. 2 schematically illustrates the vehicle station equipment which may be utilized in the system shown in Fig. 1; and Figs. 3 and 4 when laid end to end in the order named illustrate the details of the equipment provided at one of the way stations included in the system shown in Fig. 1.

Referring now to the drawings and more particularly to Fig. 1 thereof, the communication system there schematically illustrated is utilized to provide for voice signal transmission between a dispatcher station 15 and any one of a plurality of tower or way stations 16, 17, 18, 19, etc., located at spaced points along a railway track system 10. It is also used to provide for voice signal transmission between any one of the named stations and the vehicle stations 11a, 11b, 12a and 12b of two trains 11 and 12 which may be moving in the same or different directions along the track system 10. As indicated by the dash line rectangles, each train moving along the track 10 may be equipped with at least two vehicle stations. These stations may be utilized for intratrain space communication or for communication between the stations of two different trains moving in the same or opposite directions along the track system, and the two stations of each train are usually provided in the engineer's cab and the caboose or last car of the train. In accordance with conventional practice, the track system 10 is paralleled by a line 13, which is insulated from ground and may, for example, be used for power transmission or telegraphic signaling purposes. This line is commonly associated with the various way stations to function as a signal radiating and pick-up circuit by means of which voice signals modulated upon an appropriate carrier may be transmitted in either direction between the various way stations and the vehicle stations of trains moving along the track system 10. In order to provide for telephone communication between the dispatcher station 15 and the various way stations 16, 17, 18, 19, etc., these way stations are also commonly associated with the dispatcher station by means of a two-conductor telephone line 14. Each way station is provided with a telephone subset which is bridged across the line 14.

Briefly considered, the equipment provided at the dispatcher station 15 comprises a telephone substation circuit 32, facilities for selectively seizing and operatively associating the different way stations with the common signal channel 14, and a press-to talk key 34 for controlling the equipment provided at a selected way station to condition the same for the radiation of voice signals originating at the dispatcher station. The substation circuit 32 may be of any conventional form although preferably is of the well-known antiside tone type conventionally utilized at telephone substations. In lieu of a handset, it preferably employs a loud speaker and microphone as the reproducing and transmitting elements. The selective calling facilities include a plurality of oscillators 20, 21, 22 and 23, individually corresponding to the way stations 16, 17, 18 and 19, and the output voltages of which may be selectively impressed across the conductors of the line 14. Relays 28, 29, 30 and 31, arranged for selective energization by means of associated keys 24, 25, 26 and 27, are provided for selectively connecting the output terminals of the four identified oscillators across the conductors of the line 14. Current for energizing the enumerated relays may be derived from the usual storage battery 35 of appropriate voltage.

In order that the call signal receiving channel respectively provided at the way stations 16, 17, etc., and of the specific character described below, may distinguish between voice signals and call signals transmitted over the line 14, the oscillators 20, 21, 22 and 23 are adjusted to have output frequencies above the frequency range normally utilized for voice signal transmission over the line 14. Thus the voice signal transmission frequency range may be limited not to exceed an upper frequency limit of 3,000 cycles, in which case the oscillators may have output frequencies of 3,500 cycles, 3,750 cycles, 4,000 cycles and 4,250 cycles, respectively. This frequency spacing between the output frequencies of the oscillators is entirely adequate for reliable selective response of the call relays respectively provided at the way stations.

Referring now more particularly to the various way stations, it is pointed out that the equipment provided at these stations is of identical arrangement. Accordingly, only that located at the way station 18 has been illustrated in detail. In brief, the equipment at this station comprises a space signal transmitter 48, a space signal receiver 49, a call signal receiving channel 57, a call signal rectifier 62, a loud speaker 65, a microphone or transmitter 64 of the sound powered type, and a relay network controllable in the manner described below to perform the switching operations which are required in utilizing the described equipment to communicate between the dispatcher station or a vehicle station, or to relay signals between a vehicle station and the dispatcher station. More specifically, the transmitter 48 comprises an audio amplifier stage 50 and a carrier producing oscillator 52, both working into a modulator stage 51, the output of which may be impressed between the line 13 and ground through the contacts of a switching relay R110 and an appropriate coupling network 56. The receiver 49 is comprised of a two-stage signal modulated carrier amplifier 53 having its input circuit normally coupled to the line 13 and ground through the contacts of a switching relay R110 and the coupling network 56, and its output circuit coupled to the input side of a detector and automatic volume control stage 54, the output terminals of which are coupled to the input circuit of a power amplifier 55. Since the transmitter 48 and receiver 49 are substantially conventional in circuit arrangement, the individual circuit elements thereof have not been specifically identified in the drawings. Also, the coupling network 56, through which signal voltages may be transmitted in either direction between the line 13, the transmitter 48 and the receiver 49, may be of various conventional arrangements depending upon the particular character of the line 13. Regardless of its character, however, this coupling network is arranged to exclude from the transmitter 48 and the receiver 49, the voltages appearing on the line 13 in the normal use thereof, and is also arranged to provide high impedance paths between this line and ground at the frequencies of the currents traversing the line in the normal use thereof.

For the purpose of utilizing the described equipment at the way station 18 to permit a vehicle station operator to monitor the common line 14 and to then audibly call the attendant at the dispatcher station 15 if the line is idle, three relays R130, R140 and R150 are provided at this way station. These relays are arranged to be energized by transmitting a call signal through the receiver 49 to a call signal rectifier network 62, the equipment provided in the latter network being identical with that included in the channel 57. The input side of this network is coupled to the output side of the power amplifier 55 through a voice frequency blocking filter [56] *56a* of conventional design. This filter is arranged to pass the call signal, which may be radiated at a frequency of 3,250 cycles, for example, outside of the band utilized for voice transmission. Facilities including a blocking filter [57] *57a* may be provided at the output side of the amplifier 55 for preventing this call signal from being impressed upon the loud speaker 65 or the line 14. The channel 57, utilized in seizing the way station 18 from the dispatcher station 15, comprises a one or two section band pass filter 58, a call signal amplifier 59, a detector 60 and a control tube 61 connected in tandem in the order named between the line 14 and a call relay R100. The band pass filter 58 is preferably sharply tuned to pass only a received signal of 4,000 cycles, thereby excluding from the succeeding stages of the channel 57 the call signals corresponding to the other way stations as well as voice signals which may be transmitted over the line 14. In this regard, it is noted that the corresponding filters as provided at the other way stations are respectively tuned to pass only frequencies of 3,500 cycles, 3,750 cycles and 4,250 cycles, whereby the stations may only be seized when the respective corresponding keys 24, 25 and 27 are operated at the dispatcher station. In addition to the equipment thus far described, the way station 18 is also equipped with a dispatcher station call key 124 and a switching relay R120, arranged for selective energization through the contacts of a press-to talk key 66, which is utilized selectively to associate the transmitter 48 and the receiver 49 with the line 13. Voice signals are repeated from the line 14 to the transmitter 48 and from the receiver 49 to the line 14 through a coupling transformer 63 having a winding 63b bridged across the conductors of this line. The way station is further provided with a direct current source, not shown, of appropriate voltage having a positive terminal connected to ground and a negative terminal connected to all of the relay terminals identified by the negative polarity sign. This source is also utlized to supply current to the cathode heaters of the tubes embodied in the units 57, 62, 48 and 49. Anode voltages are supplied to these tubes from a 125 volt direct current source, the negative terminal of which is grounded and the positive terminal of which is connected to the conductor 126.

The vehicle stations 11a, 11b, 12a, 12b, etc., are equipped with space communication equipment of identical arrangement. In brief, the equipment provided at the vehicle station 11a comprises a microphone 41 and a loud speaker 40 which may be selectively associated with a signal pickup and radiating circuit 36 through a signal modulated carrier receiver 38 and a signal modulated carrier transmitter 39, respectively. More specifically, the input terminals of the receiver 38 are normally associated with the signal radiating and pickup circuit 36 through a coupling network 37 and the contacts of the switching relay 45. The output terminals of the transmitter 39 are also adapted to be coupled to the signal pickup and radiating circuit 36 through the contacts of the switching relay 45 and the coupling network 37. The receiver 38 and transmitter 39 may correspond precisely in circuit arrangement to the receiver 49 and transmitter 48, respectively, of the equipment provided at way station 18. The vehicle station equipment further comprises a press-to talk key 44 for selectively controlling the energization of the switching relay 45, together with facilities for modulating the carrier output of the transmitter 39 with a way station call signal. These facilities comprise a signal oscillator 42 having an output frequency which corresponds to the tuning of the filter [56] *56a* and the filter section provided in the call signal rectifier 62 of the illustrated way station 18, i. e., of the order of 3250 cycles. More specifically, the output terminals of the oscillator 42 are coupled to the input side of the transmitter 39 through a coupling condenser, [48] *48a* and this oscillator is arranged for selective operation under the control of a call key 43 having contacts for also controlling the switching relay 45. Suitable current supply facilities, including a battery or other current source having its positive and negative terminals connected to ground and to the negative terminal of the relay 45, respectively, are provided for supplying currents to the various elements of the described vehicle station equipment.

As indicated above, the radius of space transmission from any one of the vehicle and way stations must necessarily be restricted in order not to interfere with radio communication upon assigned frequency channels. To this end, straight inductive coupling of the general character described by L. O. Grondahl and P. N. Bossart in "Railway Signaling" for December 1943, starting at page 665, is preferably utilized between the signal pickup and radiating circuits 36 individual to the vehicle stations and the line-ground radiating and pickup circuit common to the several way stations. Also, the pickup and radiating circuits 36 individual to the various vehicle stations are preferably of the general character described in this article. With this arrangement, the range of transmission from each vehicle station is of course definitely restricted to a short distance, which may vary within limits depending upon the power output of the transmitter 39. Another important factor which must be considered, particularly in the spacing of the way stations 16, 17, etc., along the route followed by the railway track system 10 is the signal attenuation along the line 13. In this regard, it will be understood that the distance between this line and the vehicle station of a train traveling along the track system 10 may be very short, not exceeding a few hundred yards, such that the space link of a signal channel between the vehicle station and one of the way stations is relatively short. The conductive portion of the channel may, on the other hand, be relatively long depending upon the distance separating the vehicle station from the way station. It is the attenuation in the conductive portions of such signal channels which must be considered in determining the spacing between the way stations. In accordance with one feature of the present invention the way stations are so spaced along the route followed by the track system 10 that 100 percent overlap is provided between the signal pickup and radiating ranges of adjacent way stations. Thus, with the transmitters 39 and 48 of the vehicle and way stations set to produce signals of given field strength, the signal pickup and radiating range of the way station 18, for example, in respect to a vehicle station which is being moved along the track system 10, completely overlaps the corresponding ranges of the two adjacent way stations 17 and 19. Entirely satisfactory communications between the way stations and vehicles travelling along the track system 10 may be obtained by utilizing a spacing of from 25 to 50 miles between the adjacent way stations.

From the above description of the system, it will be understood that the space communication equipment provided at the vehicle station 11a may be utilized by the attendant at this station to communicate with the attendant at the station 11b on the same train or with either of the stations 12a and 12b of another train travelling along the track system in proximity to the train 11. Thus, if the attendant at the station 11a desires to converse with the attendant at the station 11b, he may operate the press-to talk key 44 to complete an obvious circuit for energizing the switching relay 45. This relay, in operating, opens its contacts 46 to disconnect the input terminals of the receiver 38 from the coupling network 37 and closes its contacts 47 to connect the output terminals of the transmitter 39 to the pickup and radiating circuit 36 through the coupling network 37. After the relay 45 has thus operated, the attendant at the station 11a may speak into the microphone 41 thereby to effect radiation of a voice modulated carrier by the radiating and pickup circuit 36. This signal is picked up by the circuit 36 provided at the vehicle station 11b, and is transmitted through the coupling network 37 and receiver 38 of this station to the associated loud speaker 40 for reproduction. After the attendant at station 11a has completed his statement to the attendant at the station 11b, he may release the key 44 in order to condition the equipment at the station 11a for the reception and reproduction of the reply transmitted from the called station 11b. Incident to the release of the key 44, the relay 45 is deenergized. In releasing, this relay opens its contacts 47 and closes its contacts 46, thereby to disconnect the transmitter 39 from the coupling network 37 and to establish a channel for transmitting the reply signal to the input side of the receiver 38. It will be thus understood that through selective actuation of the press-to talk keys 44 respectively provided at the two stations 11a and 11b, a two-way conversation may be held between the attendants at these two statons. Space communication may be carried on between the vehicle station 11a and the vehicle station 12a, for example, of the train 12 in exactly the same manner.

Intratrain communication or intertrain communication effected through the use of the vehicle station equipment in the manner just explained, may be monitored at the way stations within the radius of transmission of the vehicle stations involved in such communication. Thus, if the train 11 is travelling along the track 10 within the radius of reception of the way station 18 at the time the facilities of the two stations 11a and 11b are being utilized in communicating between these vehicle stations, the signals radiated from these stations are picked up by the common pickup and radiating circuit 13 and are transmitted through the coupling network 56 and the contacts 111 of the switching relay R110 to the input side of the receiver 49. In this receiver, the voice modulated carrier is amplified through the two-stage amplifier 53 and detected in the detector and A. V. C. stage 54, following which the voice frequency components of the signal are amplified in the power amplifier stage 55 and delivered through the filter network [57] *57a* and the contacts 122 of the switching relay R120 to the loud speaker 65 for reproduction. At this point it is noted that the A. V. C. circuit embodied in the receiver 49 is of substantially conventional arrangement, and functions to vary the gain through the amplifier 53 inversely in accordance with the strength of the received signal carrier, whereby the volume of the reproduced signal is maintained substantially constant regardless of the strength of the carrier appearing at the input side of the receiver.

It will thus be apparent that as the train 11, for example, moves along the track system 10, it is successively moved into the ranges of reception of the various way stations 18, 17, 16, etc., so that communication between the attendants at the stations 11a and 11b may be successively monitored by the attendants at the different way stations. It will also be understood that the attendant at the vehicle station 11a, for example, may converse directly with the attendant at any way station within the radius of transmission of the vehicle station by the simple expedient of calling this way station directly. Thus, if the attendant at the way station 11 desires to converse with the attendant at the way station 18 while the train 11 is traveling within the range of communication between these two stations, he may simply throw the press-to talk key [48] *44* to the talk position and call the way station 18, either by name or number. To reply, it is necessary for the attendant at the called way station 18 to actuate the non-locking press-to talk key 66, thereby to complete an obvious circuit for energizing the switching relay R120. In operating, this relay closes its contacts 123 to complete an obvious circuit for energizing the associated switching relay R110. At its contacts 122, the relay R120 opens the connection between the loud speaker 65 and the output circuit of the receiver 49. At its contacts 121, the relay R120 completes an obvious path for bridging the microphone 64 across the input circuit of the transmitter 48.

The relay R110, upon operating, opens its contacts 116 to interrupt the path over which anode potential is normally supplied to the four tubes of the receiver 49, thereby to render this receiver inactive. At its contacts 115, the relay R110 completes an obvious path for impressing positive anode potential upon the anodes of the three tubes included in the transmitter 48, thus rendering this transmitter active. At its contacts 114, the relay R110 opens the path over which voice signals may be transmitted from the line 14 to the loud speaker 65 and the input circuit of the transmitter 48. At its contacts 113, the relay R110 prepares a path for transmitting voice signals from the microphone 64 to the line 14. At its contacts 111, the relay R110 opens the connection between the coupling network 56 and the input terminals of the receiver 49. At its contacts 112, the relay R110 connects the coupling network to the output terminals of the transmitter 48. Thus, the equipment provided at the way station 18 is conditioned for the radiation of voice modulated carrier signals to the vehicle station 11a. More specifically, when the contacts 115 of the relay R110 are closed to apply an operating potential to the anode of the oscillator 52, operation of this oscillator to generate a high-frequency signal carrier is initiated. thereafter and when the attendant at the station 18 speaks into the [loud speaker 65] *microphone 64,* the generated voice signal is amplified through the amplifier 50 and modulated upon the generated signal carrier in the modulator stage 51. The voice modulated signal carrier appearing at the output side of the modulator 51 is impressed between the line 13 and ground through the contacts 112 and the coupling network 56 for radiation to the pickup and radiating circuit 36 of the vehicle station 11a. At this point, it is specifically noted that the voice signals generated through operation of the microphone 64 in the manner just explained are not impressed upon the line 14. Thus, with only the two relays R110 and R120 operated, the circuit over which voice signals may be transmitted from the microphone 64 to the line 14 is held open at the contacts 101, 152 and 142 of the three de-energized relays [R110] *R100* and R140. It is also noted that the voice signals which are radiated from the vehicle station 11a and transmitted through the receiver 49 to the loud speaker 65 for reproduction during a period when the two relays R110 and R120 are de-energized, are not repeated or relayed to the line 14. Under such circumstances, the connection between the output terminals of the receiver 49 and the line 14 is also held open at contacts 101, 152 and 142 of the three de-energized relays R100, R150, and R140.

After the attendant at the way station 18 has completed his reply to the attendant at the vehicle station 11a, he may release the self-restoring press-to talk key *66* [64], thereby to condition the associated equipment for the reproduction of the voice signals which may be radiated from the station 11a in response to his reply. Incident to the release of the key 66, the two relays R120 and R110 are successively de-energized in the order named. When these relays restore, the transmitter is rendered inactive and the receiver active, the coupling network 56 is switched from a connection with the transmitter 48 to a connection with the receiver 49, the connection between the microphone 64 and the transmitter 48 is broken, and the connection between the loud speaker 65 and the receiver 49 is restored, all in a manner which will be fully apparent from the above explanation. It will thus be clear that through selective actuation of the press-to talk keys 44 and 66 respectively provided at the stations 11a and 18, a two-way communication may be held between these two stations so long as the train 11 is travelling within the range of communication extending to the way station 18.

Assuming now that the attendant at the vehicle station 11a desires to converse with the dispatcher at the station 15, the call to the dispatcher station may be initiated by actuating the call key 43 for a short interval and then releasing the same. When this key is actuated, the relay 45 is energized through the contacts 43b and the start circuit for the signal oscillator 43 is completed at the contacts 43a. With the relay 45 energized and the signal oscillator 42 operating, a carrier modulated at the call frequency of the oscillator 42 is radiated from the station 11a. Assuming that the call is thus initiated while the train 11 is travelling within the range of communication between the stations 11a and 18, the modulated carrier is transmitted through the receiver 49 and the filter network *56a* [56] to the input side of the call signal rectifier 62. In this regard it is pointed out that the filter [57] *57a* has the function of blocking the received call signal against transmission to the loud speaker 65. Similarly, the filter [56] *56a* has the function of preventing signals within the voice frequency range from being transmitted to the input side of the call signal rectifier 62. It is pointed out further that a common call signal frequency, preferably of the order of 3,250 cycles, is assigned for calling any way station from any vehicle station. In other words, the signal oscillators 42 as provided at all vehicle stations are set to operate at this frequency, and the filters [56] *56a* as provided at the respective way stations are designed to pass only this frequency.

The call signal as transmitted through the filter [56] *56a* to the rectifier 62 is rectified [through this filter and is utilized] *therein* to effect a rise in the current traversing the series connected windings of the two relays R130 and R140 of sufficient magnitude to cause these relays to operate. At its contacts 141, the relay R140 opens a point in the circuit for energizing the switching relay R110. At its contacts 142, the relay R140 bridges the loud speaker 65 across the winding 63a of the transformer 63 and completes a path for connecting the indicated transformer winding across the output terminals of the receiver *49* [48]. The relay R130, upon operating, closes its contacts 131 to shunt its own winding with the series connected condenser 134 and resistor 135, thereby to render itself slow to release. At its contacts 132, the relay R130 completes an obvious circuit for energizing the slow to release relay R150. The latter relay, upon operating, closes its contacts 152 to shunt the contacts 142 in the circuits for coupling the line 14 to the input side of the transmitter 48 or the output terminals of the receiver 49. At its contacts 151, the relay R150 prepares a circuit for energizing the switching relay R110.

With the three relays R130, R140 and R150 thus operated, and with the relay 45 operated at the vehicle station 11a, a channel including the transmitter 39, the contacts 47, the coupling network 37, the space link between the stations 11a and 18, the coupling network 56, the receiver 49, the contacts 114, 142 and 152, and the coupling transformer 63, is provided for transmitting voice signals from the vehicle station 11a to the line 14 and over this line to the dispatcher station for reproduction. If, therefore, the call is sufficiently urgent, the attendant at the station 11a may call the dispatcher by speaking into the microphone 41 and identifying the train 11, without waiting to monitor the line in order to determine the idle or busy condition thereof. On the other hand, if the call is not urgent, the normal procedure is for the attendant at the station to monitor the line 14 for a short monitoring period before actually calling the dispatcher. To this end, the key 43b is released, thereby to terminate the transmission of the call signal from the station 11a to the way station 18. When this signal is terminated, the current traversing the winding of the relay R140 is rapidly decreased to effect the release of this relay. In restoring, the relay R140 opens its contacts 142 to interrupt the shunt across the contacts 152. At its contacts 141, the relay R140 completes the prepared circuit through the contacts 151 for energizing the switching relay R110.

The relay R110, upon operating, opens its contacts 111 to interrupt the channel over which the signal modulated carrier was delivered to the input side of the receiver 49. Due, however, to the described slow to release characteristics of the two relays *R130* [R140] and R150, these relays stay operated for several seconds after the delivery of the call signal voltage to the rectifier 62 is interrupted. At its contacts 112, the relay R110 connects the coupling network 56 to the output terminals of the transmitter 48, thereby to prepare the equipment for the radiation of voice signals traversing the line 14. At its contacts 114, the relay [R10] *R110* interrupts the path bridging the transformer winding 63a across the output side of the receiver 49. At its contacts 113, the relay R110 completes a path through the [parallel connected] contacts 152 [and 142] for bridging the winding 63a across the input terminals of the amplifier 50. At its contacts 116, the relay R110 opens the circuit over which anode current is delivered to the tubes of the receiver 49, thus rendering this receiver inactive. At its contacts 115, the relay R110 completes the previously described circuit for delivering anode current to the tubes of the transmitter 48, thus rendering this transmitter operative. From the above explanation, it will be understood that upon operation of the switching relay R110, the receiver 49 is rendered inactive, and the transmitter 48 is rendered operative to radiate voice signals appearing upon the line 14 as a result of the use of this line in communicating between dispatcher station 15 and the other way or vehicle stations disposed along the track 10. Thus if the line 14 is busy, the voice signals appearing thereon are impressed upon the input terminals of the transmitter 48 through the coupling transformer 63, the contacts 152, and the contacts 113. Such voice signals are modulated upon the signal carrier generated through operation of the oscillator 52 and are delivered to the line 13 for radiation to the vehicle station 11a through the contacts 112 and the coupling network 56. It will be apparent, therefore, that if the line 14 is busy at the time the call to the dispatcher station 15 is initiated at the vehicle station 11, the attendant at this vehicle station may ascertain this fact during the short monitoring period which is determined by the release time of the relays R130 and *R150* [R140]. After a period of from ten to twenty seconds, starting with the operation of the relay R110, the relay R130 is sufficiently de-energized to release. Upon restoring, this relay opens its contacts [132] *131* to interrupt the path over which the delay impedances 134 and 135 are connected in shunt with its own winding, thereby to render itself fast to operate. At its contacts 132, the relay R130 de-energizes the relay R150. The relay R150 now restores and opens its contacts 151 to de-energize the switching relay R110.

At its contacts 111 and 112, the relay R110 disconnects the line 13 from the output terminals of the transmitter 48 and reconnects this line to the input terminals of the receiver 49. At its contacts 115 and 116, the relay R110 opens the circuit for delivering anode current to the tubes of the transmitter 48 and recloses the circuit for delivering anode current to the tubes of the receiver 49. Thus, the transmitter 48 is rendered inactive and the receiver 49 is endered active. At its contacts 113, the relay R110 opens the described path for bridging the transformer winding 63a across the input terminals of the amplifier 50. At its contacts 114, the relay R110 completes a path [through] *to* the [closed] contacts 152 for *preparing a circuit for* bridging the transformer winding 63a across the output terminals of the receiver 49. Thus the equipment provided at the way station 18 is restored to normal.

If upon monitoring the line 14 in the manner just described the attendant at the vehicle station 11a finds that the line is idle, he may then call the dispatcher at the station 15 by again pressing the key 43 and talking into the microphone 41. When the key 43 is operated, the relays 45, R130, R140 and R150 function in the manner explained above to condition the equipment at the way station 18 for the relaying of voice signals from the station 11a to the line 14. Accordingly, the attendant may speak into the microphone 41 and identify the vehicle station 11a as a calling station at the dispatcher station 15. Upon release of the key 43, the relays R130, R140 and R150 function to first establish the described monitoring channel and to then restore the equipment at the way station 18 to normal.

From the above explanation it will be apparent that the described monitoring period is measured by the release time of the relays R130 and R150. If desired, the two relays R130 and R150 may be of the dash-pot type, in order to provide for monitoring periods of longer duration than can be obtained by conventional slow-to-release relays. It will also be understood that since the three relays R130, R140 and R150, as respectively provided at the different way stations, are arranged to respond to call signals of the same frequency, i. e., 3250 cycles, and the vehicle stations are equipped to transmit call signals of only this frequency, the equipment at two of the way stations may be concurrently operated in the exact manner described above when a call signal is radiated from a vehicle station. Thus if the station 11a is located at a point between the two way stations 17 and 18 at the time the above-described call to the dispatcher station 15 is initiated thereat, the equipment at each of the two stations 18 and 17 will be concurrently operated to establish two parallel monitoring and call channels between the line 14 and the vehicle station 11a.

As indicated above, if the line 14 common to the several way stations is not busy at the time the above described call is initiated at the vehicle station 11a, the attendant at the latter station may audibly call the dispatcher attending the station 15 by speaking into the microphone 41 and identifying his particular vehicle station. The voice currents are modulated upon the carrier output of the transmitter 39 and radiated to the way station 18 where they are picked up by the receiver 49, demodulated in the detector 54, amplified in the amplifier 55 and transmitted through the coupling transformer 63 and over the line 14 for reproduction by the loud speaker at the dispatcher station 15. They are also delivered from the receiver output circuit through the contacts 122 to the loud speaker 65 for reproduction. Thus the attendant at the way station 18 is informed that the dispatcher is being called from the vehicle station 11a. Knowing the identity of the vehicle station 11a, the dispatcher attending the station 15 may, by consulting train schedules, ascertain the approximate location of the train 11 along the track system 10 and thus be informed as to the proper way station to seize in order to establish a two-way communication channel between the dispatcher station and the calling vehicle station 11a. In the case under consideration, the dispatcher can readily ascertain that the way station 18 is within the range of communication with the vehicle station 11a. To seize this way station, the dispatcher may actuate the locking call key 26, thereby to energize the relay 30. This relay, in operating, bridges the output terminals of the 4000 cycle oscillator 22 across the conductors of the line 14. The high-frequency voltage is passed through the filter 58 at the way station 18 and is impressed upon the input circuit of the amplifier 59. At each of the other way stations. the band pass filter 58 functions to prevent the described call signal voltage from appearing in the input circuit of the associated amplifiers 59. The signal voltage appearing at the output side of the illustrated filter 58 is amplified through the amplifier 59, rectified in the detector 60, and the direct current component thereof is utilized to decrease the bias between the input electrodes of the control tube 61, thereby to increase the current traversing the winding of the call relay R100. This current increase is sufficient to cause the relay R100 to operate. At its contacts 101, the relay R100 bridges the transformer winding 63a across the output terminals of the receiver 49 and prepares a path for bridging this winding across the input terminals of the transmitter 48. At its contacts 102, the relay R100 prepares a circuit for energizing the switching relay R110. The station call key 26 is held in its off-normal position to maintain the output terminals of the oscillator 22 bridged across the conductors of the line 14 for the duration of the call to the vehicle station 11a. Substantially concurrently with the operation of this key, the press-to talk key 34 is operated to complete an obvious path for connecting the negative terminal of the battery 35 to the line conductors 14a and 14b through opposite halves of the transformer winding 33a. The voltage thus applied to the conductors of the line 14 serves to energize the switching relay R110 in a circuit which includes the conductors 14a and 14b in parallel, the two halves of the transformer winding 63b and the contracts 102. In operating, the relay R110 prepares the equipment at the way station 18 for the radiation of voice signals impressed upon the line 14 in a manner which will be fully apparent from the preceding explanation. Following the operation of the two keys 26 and 34 to effect the described switching operations at the way station 18, the dispatcher attending the station 15 may speak into the microphone or transmitter embodied in the sub-station equipment 32 to transmit voice signals over the line 14 to the way station 18. With the transmitter 48 active, these signals are modulated upon the carrier output of the oscillator 52 and radiated from the line 13 to the pick up and radiating circuit 36 at the vehicle station 11a. From this circuit, they are transmitted through the coupling network 37 and the receiver 38 to the loud speaker 40 for reproduction. It will be noted that since the relay R110 is operated, the contacts 114 are open to prevent the voice signals originating at the dispatcher station 15 from being reproduced by the loud speaker 65. After the dispatcher has answered the call in the manner just described, the key 34 may be restored to normal to de-energize the switching relay R110 and thus prepare the equipment at the way station 18 for the trainsmission of voice signals in the reverse direction, i. e., from the vehicle station 11a to the dispatcher station 32. To initiate such voice transmission, it is obviously necessary for the attendant at the vehicle station 11a to actuate the press-to talk key 44 for the purpose of associating the transmitter 39 with the pickup and radiating circuit 36. More generally, it will be apparent from the above explanation that by appropriate manipulation of the press-to talk keys 44 and 34 respectively provided at the two stations 11a and 15, voice signals may be transmitted in either direction between these two stations over a communication channel which includes the space link between the station 11a and the way station 18 and the wire link connecting this way station with the dispatcher station 15. The voice signals originating at the vehicle station are reproduced by the loud speaker 65 and serve to keep the attendant at the way station 18 advised as to the duration of the call. After the conversation has been concluded, the dispatcher at the station 15 may release the equipment at the way station 18 by restoring the call key 26 to normal. In response to this operation, the relay 30 restores to disconnect the output terminals of the oscillator 22 from the line conductors 14a and 14b, thereby to de-energize the call relay R100. In releasing, the relay R100 opens its contacts 101 to interrupt the paths over which the transformer winding 63a may be selectively bridged across the input terminals of the transmitter 48 or the output terminals of the receiver 49. Thus, the equipment at the way station 18 is restored to normal.

The manner in which the communication equipment respectively provided at the other way stations may be seized on a selective basis through selective operation of the call keys 24, 25 and 27 will be evident from the preceding explanation. It will also be understood that if the dispatcher attending the station 15 desires to talk with the attendant at the way station 18, for example, the call key 26 is actuated to impress the output voltage of the oscillator 22 across the conductors of the line 14 and thus effect operation of the call relay R100. With this relay operated and the two relays R100 and R120 released, voice signals transmitted over the line 14 from the dispatcher station 15 are impressed upon the loud speaker 65 through the coupling transformer 63 and the contacts 101, 114 and 122. Such signals are not impressed upon the input side of the transmitter 48 for radiation from the way station 14. Thus with only the relay R100 operated at the station 18, the path for transmitting voice signals from the line 14 to the transmitter 48 is held open at the contacts 113. To answer the call, it is necessary for the attendant at the way station 18 to actuate the press-to talk key 66 for the purpose of energizing the relay R120. This relay, in operating, closes its contacts 123 to energize the switching relay R110. At its contacts 121 and 122 the relay R120 disconnects the loud speaker 65 from the transformer winding 63 and prepares a path for bridging the microphone 64 across this transformer winding. The relay R110, in operating, closes its contacts 113 to connect the microphone 64 across the transformer winding 63a. The remaining circuit switching operations of the relay R110 are without effect. Following operation of the relays R120 and R110, voice signals may obviously be transmitted from the microphone 64 through the transformer 63 and over the line 14 for reproduction by the loud speaker provided at the dispatcher station 15. It will be understood, therefore, that by selective actuation of the press-to talk key 66 at the called way station 18, voice signals may be transmitted in either direction between the two stations 15 and 18. In this regard it will be noted that with the two relays R110 and R120 operated, the transmitter 48 is conditioned for operation and voice signals developed through operation of the mircophone 64 are impressed upon the input circuit of this transmitter. Thus, the voice signals are radiated by the transmitter 48 and are received at the vehicle station of any vehicle moving along the track system 10 within the range of transmission of the way station 18. The attendant at any such vehicle station is thus informed that the way station 18 is busy. Here again, the release of the equipment at the way station 18 is under the control of the dispatcher attending the station 15, such release being effected by restoring the call key 26 to normal to effect the deenergization and release of the call relay R100. In a manner entirely similar to that just described, the dispatcher attending the station 15 may selectively call the attendants at any one of the way stations 16, 17, 19, etc., associated with the line 14.

It will be noted that when the equipment at the way station 18 is not in use on calls involving the dispatcher station 15, all of the relays provided thereat are deenergized. With the relays R100, R150 and R140 restored, the contacts 101, 152 and 142 are open to prevent voice signals from being transmitted from the line 14 to the loud speaker 65 or the input circuit of the transmitter 48 and to prevent voice signals from being transmitted from the output circuit of the receiver 49 or the microphone 64 to the line 14. Thus, the line 14 is guarded against receiving voice signals which might interfere with the use thereof by the dispatcher attending the dispatcher station 15. If the attendant at the way station 18, for example, desires to monitor the line 14 for the purpose of determining the idle or busy condition thereof, he may actuate the key 124 to bridge the loud speaker 65 and the input circuit of the transmitter 48 across the transformer winding 63a over a path which includes the contacts 114 and the contacts 122. With this monitoring connection established, voice signals appearing upon the line 14 are obviously transmitted to the loud speaker 65 for reproduction. If upon establishing this monitoring connection, the attendant at the way station 18 ascertains that the line 14 is idle, he may call the dispatcher station 15 by actuating the press-to talk key 66, thereby to effect the sequential operation of the two relays R120 and R110 in the manner described above. With these two relays operated, the loud speaker 65 is disconnected from the transformer winding 63 and the microphone 64 is bridged across this winding to complete a channel over which voice signals may be transmitted to the dispatcher station 15 for reproduction. After instituting a call in the manner just described, the attendant at the way station 18 may, by selective operation of the key 66, condition the equipment at the way station 18 for the reception of signals received over the line 14 or the transmission of signals to this line, thereby to provide for a two-way communication with the dispatcher station 15. After the call is completed, the key 124 should be restored to normal in order to interrupt the minotoring connection between the loud speaker 65 and the line 14.

While there has been described what is at present considered to be the preferred embodiment of the invention, it will be understood that various modifications may be made therein which are within the true spirit and scope of the invention as defined in the appended claims.

I claim:

1. A system for communicating between a dispatcher station and a vehicle moving along a predetermined route, comprising way stations provided at spaced points along said route and each including space transmitting and receiving means, signal radiating and pickup means common to the transmitting and receiving means at said way stations, a station carried by said vehicle and including space transmitting and receiving means, a [signal] *single two-way telephone* channel commonly associating said way stations with said dispatcher station *and constituting the sole means for such purpose,* and means for selectively establishing communication channels between said dispatcher station and said vehicle station over routes which respectively include different ones of said way stations.

2. A system for communicating between a dispatcher station and a vehicle moving along a predetermined route, comprising way stations provided at spaced points along said route, *a single two-way telephone channel commonly associating a dispatcher station with the way stations,* a station on said vehicle, means providing for space communicating between said vehicle station and different ones of said way stations when said vehicle is disposed at different points along said route, and means *controllable solely by way of said telephone channel* for selectively establishing communication channels between said dispatcher station and said vehicle station over routes which respectively include different ones of said way stations *and all of which include said telephone channel.*

3. A system for communicating between a dispatcher station and a vehicle moving along a predetermined route, comprising way stations provided at spaced points along said route, *a single two-way telephone channel commonly associating the dispatcher station with the way stations,* a station on said vehicle, means providing for space communication between said vehicle station and different ones of said way stations when said vehicle is disposed at different points along said route, means at said vehicle station for signaling said dispatcher station over different routes which respectively include the nearest ones of said way stations *and all of which include said telephone channel* as said vehicle moves along said predetermined route, and means at said dispatcher station *controllable solely by way of said telephone channel* for establishing communication channels between said dispatcher station and said vehicle station over routes which respectively include different ones of said way stations *and all of which include said telephone channel.*

4. A system for communicating between a dispatcher station and a vehicle moving along a predetermined route, comprising way stations provided at spaced points along said route, *a single two-way telephone channel commonly associating said dispatcher station with said way stations,* a station on said vehicle, means providing for space communication between said vehicle station and different ones of said way stations when said vehicle is disposed at different points along said route, means at said way stations selectively controllable from said dispatcher station *solely by way of said telephone channel* for establishing one way communication channels between said dispatcher station and said vehicle station over routes which respectively include different ones of said way stations *and all of which include said telephone channel,* and means at the way station included in any one of said *communication* channels and controllable from at least one of the vehicle and dispatcher stations for changing the direction in which signals may be transmitted over the *communication* channel.

5. A system for communicating between a dispatcher station and a vehicle moving along a predetermined route, comprising way stations provided at spaced points along said route, *a single two-way telephone channel commonly associating the dispatcher station with the way stations,* a station on said vehicle, means providing for space communication between said vehicle station and different ones of said way stations when said vehicle is disposed at different points along said route, means at said dispatcher station for selectively seizing said way stations *solely by way of said telephone channel* to establish one way communication channels between said dispatcher station and said vehicle station *over routes which commonly include said telephone channel,* and means at any seized one of said way stations controllable from said dispatcher station *over said telephone channel* for changing the direction of signal transmission over the established communication channel.

[6. A system for communicating between a dispatcher station and a vehicle moving along a predetermined route, comprising way stations provided at spaced points along said route, a station on said vehicle, said way stations and vehicle station each including space communication equipment of limited predetermined communicating range in either direction along said route, said way stations being so spaced along said route that the range of communication of each way station substantially overlaps the range of communication of each adjacent way station, whereby said vehicle station is successively moved into the ranges of communication of different pairs of said way stations as said vehicle proceeds along said route, and means for selectively establishing communication channels between said dispatcher station and said vehicle station over routes which respectively include the way station nearest or next nearest said vehicle.]

7. A system for communicating with a vehicle moving along a predetermined route, comprising a master station, a plurality of way stations located at spaced points along said route, a *single two-way telephone* [signal] channel commonly associating said master station with said way stations, said way stations each including space communicating equipment for radiating signals to a vehicle moving along said route and for receiving signals radiated from the vehicle, and means controllable from said master station [over said] *solely by way of said telephone* [signal] channel for selectively associating said way stations with said channel for the transmission of signals between said master station and the space communicating equipment at any selected way stations *over said telephone channel.*

8. A system for communicating with a vehicle moving along a predetermined route, comprising a master station, a plurality of way stations located at spaced points along said route, a *single two-way telephone* [signal] channel commonly associating said master station with said way stations, said way stations each including space communicating equipment for radiating signals to a vehicle moving along said route and for receiving signals radiated from the vehicle, means controllable from said master station [over said] *solely by way of said telephone* [signal] channel for selectively associating said way stations with said channel for the transmission of signals in one direction *by way of said channel* between said master station and the space communicating equipment of the selected way station, and means at the selected way station, [also] controllable over said [signal] channel, for controlling the equipment at the selected way station to change the direction in which signals may be transmitted between the master station and the selected way station *by way of said channel.*

9. A system for communicating with a vehicle moving along a predetermined route, comprising a master station, a plurality of way stations located at spaced points along said route, a signal channel commonly associating said master station with said way stations, said way stations each including space communicating equipment for radiating signals received over said channel to a vehicle moving along said route and for relaying signals radiated from said vehicle to said channel, means at said master station for selectively transmitting control signals [over] *solely by way of* said channel having frequencies respectively corresponding to the different way stations, and means at said way stations selectively responsive to said control signals of different frequencies for selectively associating said way stations with said channel for the transmission of signals between said master station and the space communicating equipment at any selected way station.

10. A system for communicating with a vehicle moving along a predetermined route, comprising a master station, a plurality of way stations located at spaced points along said route, a two-conductor signal channel commonly associating said master station with said way stations; said way stations each including space communicating equipment for radiating signals received over said channel to a vehicle moving along said route and for relaying signals radiated from said vehicle to said channel, means at said master station for selectively transmitting control signals over said channel having frequencies respectively corresponding to the different way stations, means at said way stations selectively responsive to said control signals of different frequencies for selectively associating said way stations with said channel for the transmission of signals received by the equipment at the selected way station to said master station over said channel, and means at the selected way station controllable over the two conductors of said channel in parallel from said master station for selectively conditioning the equipment at the selected way station for the radiation of signals received over said channel from said master station.

11. A system for communicating with a vehicle moving along a predetermined route, comprising a master station, a plurality of way stations located at spaced points along said route, a signal channel commonly associating said master station with said way stations, said way stations each including space communicating equipment for radiating to a vehicle moving along said route signals having frequencies within a predetermined frequency band and received over said signal channel and for relaying signals radiated from said vehicle to said channel, means at said master station for selectively transmitting control signals over said channel having frequencies outside said predetermined frequency band and respectively corresponding to the different way stations, and means at said way stations selectively responsive to said control signals of different frequencies for selectively associating said way stations with said channel for the transmission of signals between said master station and the space communicating equipment at any selected way station.

12. A system for communicating with a vehicle moving along a predetermined route, comprising a master station, a plurality of way stations located at spaced points along said route, a two-conductor signal channel commonly connecting said way stations with said master station, said way stations each including space communicating equipment for radiating to a vehicle moving along said route signals having frequencies within a predetermined frequency band and received over said signal channel from said master station, and for relaying signals radiated from said vehicle to said channel, means at said master station for selectively transmitting control signals over said channel having frequencies outside said predetermined frequency band and respectively corresponding to the different way stations, means at said way stations selectively responsive to said control signals of different frequencies for selectively associating said way stations with said channel for the transmission of signals received by the equipment at the selected way station to said master station over said channel, and means at the selected way station controllable over the two conductors of said channel in parallel for selectively conditioning the equipment at the selected way station for the radiation of signals received over said channel from said master station.

13. A system for communicating between a master station and a vehicle moving along a predetermined route, comprising a way station located along said route, a station on said vehicle, means at said vehicle and way stations providing a space communication link between said vehicle and way stations, a general purpose communication channel associating said master station with said way station, and means at said way station controllable over said space link from said vehicle station for permitting said communication channel to be monitored from said vehicle station over said space link.

14. A system for communicating between a master station and a vehicle moving along a predetermined route, comprising a way station located along said route, a station on said vehicle, means at said vehicle and way stations providing a space communication link between said vehicle and way stations, a general purpose communication channel associating said master station with said way station, and means at said way station controllable over said space link from said vehicle station for establishing a calling connection between said vehicle and master stations which includes said space link and over which a call signal may be transmitted to said master station, and for then altering the connection to establish a monitoring connection between vehicle and way stations over which said communication channel may be monitored from said vehicle station.

15. A system for communicating between a master station and a vehicle moving along a predetermined route, comprising a way station located along said route, a station on said vehicle, means at said vehicle and way stations providing a space communication link between said vehicle and way stations, a general purpose communication channel associating said master station with said way station, means at said way station controllable over said space link from said vehicle station for establishing a calling connection between said vehicle and master stations which includes said space link and over which a call signal may be transmitted to said master station, and for then altering the connection to establish a monitoring connection between vehicle and way stations over which said communication channel may be monitored from said vehicle station, and means at said way station controllable over said communication channel from said master station for establishing a communication connection between said master station and said vehicle station which includes said communication channel and space link in series.

16. A system for communicating between a master station and a vehicle moving along a predetermined route, comprising a way station located along said route, a station on said vehicle, space communication equipment at said vehicle and way stations providing a space communication link between said vehicle and way stations, a general purpose communication channel associating said master station with said way station, means at said vehicle station for transmitting a control signal to said way station over said space link, means at said way station responsive to said control signal for conditioning the equipment at said way station to relay signals radiated from said vehicle station to said communication channel, thereby to permit call signals to be transmitted to said communication channel from said vehicle station, and means operative following the operation of said last-named means for conditioning, for a period of limited duration, the equipment at said way station to relay signals received over said communication channel to said space link, whereby said communication channel may be monitored from said vehicle station.

17. A system for communicating between a master station and a vehicle moving along a predetermined route, comprising a way station located along said route, a station on said vehicle, space communication equipment at said vehicle and way stations providing a space communication link between said vehicle and way stations, a general purpose communication channel associating said master station with said way station, means at said vehicle station for transmitting a control signal to said way station over said space link, means at said way station responsive to said control signal for conditioning the equipment at said way station to relay signals radiated from said vehicle station to said communication channel, thereby to permit call signals to be transmitted to said communication channel from said vehicle station, means operative following the operation of said last-named means for conditioning, for a period of limited duration, the equipment at said way station to relay signals over said space link from said communication channel, whereby said communication channel may be monitored from said vehicle station, and means at said way station controllable over said communication channel from said master station for establishing a communication connection between said master station and said vehicle station which includes said communication channel and space link in series.

18. A system for communicating with a vehicle moving along a predetermined route, comprising a dispatcher station, a plurality of way stations located at spaced points along said route, a station on said vehicle, a *single* general purpose *two-wire* communication channel commonly associating said dispatcher station with said way stations, said way stations and said vehicle station each including space communicating equipment for radiating signals and receiving radiated signals, whereby different space communication links may be established between said vehicle station and different ones of said way stations, and means controllable from said dispatcher station [over] *solely by way of* said *two-wire* communication channel for selectively establishing communication channels between said dispatcher and vehicle stations over routes which respectively include different selected ones of said space links *and all of which include said two-wire channel.*

19. A system for communicating with a vehicle moving along a predetermined route, comprising a dispatcher station, a plurality of way stations located at spaced points along said route, a station on said vehicle, a general purpose communication channel commonly associating said dispatcher station with said way stations, said way stations and said vehicle station each including space communicating equipment for radiating signals and receiving radiated signals, whereby different space communication links may be established between said vehicle and way stations, means at each way station controllable over the associated space link from said vehicle station for permitting said communication channel to be monitored from said vehicle station over said associated space link, and means controllable from said master station over said communication channel for selectively establishing communication channels between said dispatcher and vehicle stations over routes which respectively include different selected ones of said space links.

20. A system for communicating between a master station and a vehicle moving along a predetermined route, comprising a way station located along said route, a station on said vehicle, space communication equipment at said vehicle and way stations providing a space communication link between said vehicle and way stations, a general purpose communication channel associating said master station with said way station, means at said vehicle station for transmitting a control signal to said way station over said space link, means at said way station responsive to said control signal for conditioning the equipment at said way station to relay signals radiated from said vehicle station to said communication channel, thereby to permit call signals to be transmitted to said communication channel from said vehicle station, and means responsive to the termination of said control signal for conditioning the equipment at said way station to relay signals received over said communication channel to said vehicle station whereby said communication channel may be monitored from said vehicle station.

*21. A system for communicating between a dispatcher station and a vehicle moving along a predetermined route, comprising way stations provided at spaced points along said route, a station on said vehicle, means providing for space communication between said vehicle station and different ones of said way stations when said vehicle is disposed at different points along said route, means for selectively establishing communication channels between said dispatcher station and said vehicle station over routes which respectively include different ones of said way stations, and means controllable from the vehicle station for obtaining an indication at said vehicle station of the busy or idle condition of the communication channels.*

*22. A system for communicating between a dispatcher station and a vehicle moving along a predetermined route, comprising way stations provided at spaced points along said route, a station on said vehicle, means providing for space communication between said vehicle station and different ones of said way stations when said vehicle is disposed at different points along said route, means at said vehicle station for signaling said dispatcher station over different routes which respectively include the nearest ones of said way stations as said vehicle moves along said predetermined route, means at said dispatcher station for establishing communication channels between said dispatcher station and said vehicle station over routes which respectively include different ones of said way stations, and means controllable from the vehicle station for obtaining an indication at said vehicle station of the busy or idle condition of the communication channels.*

*23. A system for communicating between a dispatcher station and a vehicle moving along a predetermined route, comprising way stations provided at spaced points along said route, a station on said vehicle, means providing for space communication between said vehicle station and different ones of said way stations when said vehicle is disposed at different points along said route, means at said dispatcher station for selectively seizing said way stations to establish one way communication channels between said dispatcher station and said vehicle station, means at any seized one of said way stations controllable from said dispatcher station for changing the direction of signal transmission over the established communication channel, and means controllable from the vehicle station for obtaining an indication at said vehicle station of the busy or idle condition of the communication channels.*

*24. A system for communicating with a vehicle moving along a predetermined route, comprising a master station, a plurality of way stations located at spaced points along said route, a single two-way telephone channel commonly associating said master station with said way stations, said way stations each including space communicating equipment for radiating signals to a vehicle moving along said route and for receiving signals radiated from the vehicle, means controllable from said master station over said telephone channel for selectively associating said way stations with said channel for the transmission of signals between said master station and the space communicating equipment at any selected way stations over said telephone channel, and means at the vehicle station responsive to signals derived from at least one of the way stations for obtaining an indication at said vehicle station of the busy or idle condition of said telephone signal channel.*

*25. A system for communicating with a vehicle moving along a predetermined route, comprising a master station, a plurality of way stations located at spaced points along said route, a single two-way telephone channel connecting said master station with each of said way stations, said way stations each including space communicating equipment for radiating signals to a vehicle moving along said route and for receiving signals radiated from the vehicle, means controllable from said master station solely by way of said channel for selectively associating said way stations with said channel for the transmission of signals in one direction by way of said channel between said master station and the space communicating equipment of the selected way station, means at the selected way station, controllable over said channel, for controlling the equipment at the selected way station to change the direction in which signals may be transmitted between the master station and the selected way station by way of said channel, and means at the vehicle station for obtaining an indication at said vehicle station of the busy or idle condition of said channel.*

*26. A system for communicating with a vehicle moving along a predetermined route, comprising*

*a dispatcher station, a plurality of way stations located at spaced points along said route, a station on said vehicle, a single two-way general purpose communication channel commonly connecting said dispatcher station with each of said way stations, said way stations and said vehicle station each including space communicating equipment for radiating signals and receiving radiated signals whereby different space communication links may be established between said vehicle station and different ones of said way stations, means controllable from said dispatcher station solely by way of said general purpose channel for selectively establishing communication channels between said dispatcher and vehicle stations over routes which respectively include different selected ones of said space links and commonly include said general purpose channel, and means at the vehicle station for obtaining an indication at said vehicle station of the busy or idle condition of said general purpose channel.*

*27. A system for communicating between a dispatcher station and a vehicle moving along a predetermined route, comprising way stations provided at spaced points along said route, a single two-way telephone channel commonly connecting said dispatcher station with each of said way stations, a station on said vehicle, means providing for two-way space communication between said vehicle station and different ones of said way stations when said vehicle is disposed at different points along said route, means for selectively establishing communication channels between said dispatcher station and said vehicle station over routes which commonly include said telephone channel and respectively include different ones of said way stations, and means for producing an indication at said vehicle station representative of the busy or idle condition of said telephone channel.*

*28. A system for communicating between a dispatcher station and a vehicle moving along a predetermined route, comprising way stations provided at spaced points along said route, a single two-way telephone channel commonly connecting said dispatcher station with each of said way stations, a station on said vehicle, means providing for two-way space communication between said vehicle station and different ones of said way stations when said vehicle is disposed at different points along said route, means at said vehicle station for signaling said dispatcher station over different routes which respectively include the nearest ones of said way stations and commonly include said telephone channel, means controllable from said dispatcher station over said telephone channel for establishing communication channels between said dispatcher station and said vehicle station over routes which respectively include different ones of said way stations and commonly include said telephone channel, and means controllable from said vehicle station for determining the busy or idle condition of said telephone channel.*

*29. A system for communicating between a dispatcher station and a vehicle moving along a predetermined route, comprising way stations provided at spaced points along said route, a single two-way telephone channel commonly connecting the dispatcher station with each of said way stations, a station on said vehicle, means providing for space communication between said vehicle station and different ones of said way stations when said vehicle is disposed at different points along said route, means at said way stations selectively controllable over the telephone channel from said dispatcher station for establishing one way communication channels between said dispatcher station and said vehicle stations over routes which respectively include different ones of said way stations and commonly include said telephone channel, means at the way station included in any one of said routes and controllable from at least one of the vehicles and dispatcher stations for changing the direction in which signals may be transmitted over the channel, and means at the vehicle station for providing an indication of the busy or idle condition of said telephone channel.*

*30. A system for communicating between a dispatcher station and a vehicle moving along a predetermined route, comprising way stations provided at spaced points along said route and each including space transmitting and receiving means, signal radiating and pickup means common to the transmitting and receiving means at said way stations, a station carried by said vehicle and including space transmitting and receiving means, a signal channel commonly associating said way stations with said dispatcher station, means on said vehicle for transmitting a distinctive control signal to the nearest one of said way stations, means in said one way station responsive to said control signal for conditioning the equipment at said one way station to relay signals radiated from said vehicle station to said signal channel, thereby to permit call signals to be transmitted to said signal channel, and means for selectively establishing communication channels between said dispatcher station and said vehicle station over routes which respectively include different ones of said way stations.*

*31. A system for communicating with a vehicle moving along a predetermined route, comprising a master station, a plurality of way stations located at spaced points along said route, a signal channel commonly associating said master station with said way stations, said way stations each including space communicating equipment for radiating signals received over said channel to a vehicle moving along said route and for relaying signals radiated from said vehicle to said channel, means on said vehicle for transmitting a distinctive control signal to the nearest one of said way stations, means in said one way station responsive to said control signal for conditioning the equipment at said one way station to relay signals radiated from said vehicle station to said signal channel, thereby to permit call signals to be transmitted to said signal channel, means at said master station for selectively transmitting control signals over said channel having frequencies respectively corresponding to the different way stations, and means at said way stations selectively responsive to said control signals of different frequencies for selectively associating said way stations with said channel for the transmission of signals between said master station and the space communicating equipment at any selected way station.*

ROBERT A. CLARK, JR.

References Cited in the file of this patent or the original patent

UNITED STATES PATENTS

| Number | Name | Date |
|---|---|---|
| 1,552,919 | Gauthier | Sept. 8, 1925 |